(12) United States Patent
Baek et al.

(10) Patent No.: US 9,484,558 B2
(45) Date of Patent: Nov. 1, 2016

(54) BATTERY CELL AND BATTERY MODULE USING THE SAME

(71) Applicant: LG CHEM, LTD., Seoul (KR)

(72) Inventors: Seoung Mun Baek, Daejeon (KR); Hyungjin Hwang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 165 days.

(21) Appl. No.: 14/361,924

(22) PCT Filed: Oct. 1, 2013

(86) PCT No.: PCT/KR2013/008794
§ 371 (c)(1),
(2) Date: May 30, 2014

(87) PCT Pub. No.: WO2015/050281
PCT Pub. Date: Apr. 9, 2015

(65) Prior Publication Data
US 2015/0270514 A1  Sep. 24, 2015

(51) Int. Cl.
*H01M 2/02* (2006.01)
*H01M 10/613* (2014.01)
*H01M 2/10* (2006.01)
*H01M 10/647* (2014.01)
*H01M 10/6557* (2014.01)

(52) U.S. Cl.
CPC ........... *H01M 2/024* (2013.01); *H01M 2/1061* (2013.01); *H01M 2/1077* (2013.01); *H01M 10/613* (2015.04); *H01M 10/647* (2015.04); *H01M 10/6557* (2015.04); *H01M 2220/20* (2013.01)

(58) Field of Classification Search
CPC ........... H01M 10/613; H01M 10/647; H01M 10/6557; H01M 2220/20; H01M 2/024; H01M 2/1061; H01M 2/1077
See application file for complete search history.

(56) References Cited

U.S. PATENT DOCUMENTS

| | | | |
|---|---|---|---|
| 2002/0021107 A1* | 2/2002 | Ripoll | H01M 2/0245 320/112 |
| 2006/0063067 A1* | 3/2006 | Kim | H01M 2/021 429/148 |
| 2008/0160395 A1 | 7/2008 | Okada et al. | |
| 2009/0246616 A1* | 10/2009 | Koyama | H01M 2/1077 429/153 |
| 2010/0178547 A1* | 7/2010 | Li | H01M 2/0245 429/151 |

(Continued)

FOREIGN PATENT DOCUMENTS

| | | |
|---|---|---|
| EP | 1 944 824 A2 | 7/2008 |
| EP | 2 207 221 A1 | 7/2010 |

(Continued)

OTHER PUBLICATIONS

Korean Office Action dated Oct. 6, 2015 for Appl. No. 10-2015-0096558 (w/ English translation).

(Continued)

*Primary Examiner* — Carlos Barcena
(74) *Attorney, Agent, or Firm* — Birch, Stewart, Kolasch & Birch, LLP

(57) ABSTRACT

A battery cell and a battery module using the same that allow the battery cell to be extended without a limit in the number of battery cells is provided. The battery cell includes a body, at least one rail installed in the body, and at least one rail groove formed on the other surface of the body where the rail is not installed.

7 Claims, 4 Drawing Sheets

(56) References Cited

U.S. PATENT DOCUMENTS

| | | | |
|---|---|---|---|
| 2011/0081567 A1 | 4/2011 | Lin et al. | |
| 2011/0236740 A1* | 9/2011 | Paolazzi | H01M 2/0245 429/120 |
| 2011/0256446 A1* | 10/2011 | Bronczyk | H01M 2/1077 429/163 |
| 2012/0135295 A1 | 5/2012 | Kim et al. | |
| 2013/0034755 A1 | 2/2013 | Kim | |
| 2013/0280565 A1 | 10/2013 | Lee et al. | |

FOREIGN PATENT DOCUMENTS

| | | | |
|---|---|---|---|
| GB | 2 044 983 A | | 10/1980 |
| JP | 58-63769 A | | 5/1981 |
| JP | 1-168953 U | | 11/1989 |
| JP | 10-3899 A | | 1/1998 |
| JP | 10-64492 A | | 3/1998 |
| JP | 2008-166191 A | | 7/2008 |
| JP | 2008-205225 | * | 9/2008 ............... H05K 7/14 |
| JP | 2009-231143 A | | 10/2009 |
| JP | 2010-225337 A | | 10/2010 |
| JP | 2011-134554 A | | 7/2011 |
| KR | 20-1999-0024177 U | | 7/1999 |
| KR | 10-2012-0051237 A | | 5/2012 |
| KR | 10-2012-0059049 A | | 6/2012 |
| KR | 10-1227654 B1 | | 1/2013 |
| KR | 10-2013-0015115 A | | 2/2013 |
| TW | M279986 U | | 11/2005 |
| TW | I382577 B1 | | 1/2013 |

OTHER PUBLICATIONS

Taiwan Office Action for Appl. No. 102138691 dated Sep. 10, 2014 (w/ English translation).
Korean Office Action for Appl. No. 10-2012-0073006 dated Feb. 27, 2015 (w/ English translation).
Korean Office Action dated May 27, 2015 for Appl. No. 10-2012-0073006 (w/ English translation).
International Search Report for Appl. No. PCT/KR2013/008794 dated Jun. 27, 2014 (w/ English translation).
Written Opinion of the International Searching Authority for Appl. No. PCT/KR2013/008794 dated Jun. 27, 2014 (w/ English translation).
Korean Office Action for Appl. No. 10-2012-0073006 dated Aug. 29, 2014 (w/ English translation).
European Search Report for Appl. No. 13838043.1 dated Aug. 26, 2015.
European Search Report for Appl. No. 13838043.1 dated Mar. 31, 2015.
Chinese Office Action with English language translation mailed on Jun. 23, 2016 in copending Chinese Application No. 201380004299.1.
Japanese Office Action for Appl. No. 2015-540592 dated Dec. 8, 2015 (w/ English translation).

* cited by examiner

BATTERY CELL AND BATTERY MODULE USING THE SAME

TECHNICAL FIELD

The present invention relates to a battery cell and a battery module using the same, and more particularly, to a battery cell and a battery module using the same that are used to extend voltage or a current amount.

BACKGROUND ART

In recent years, interest in a secondary battery has rapidly increased due to reasons such as an economic advantage and an environmental advantage. The secondary battery is a device that stores external electric energy in a form of chemical energy and thereafter, generates electricity as necessary and a utilization range thereof has been extended to an electric vehicle in recent years. The secondary battery is constituted by at least one battery cell and may be used by extending voltage or a current amount by electrically connecting a plurality of battery cells according to a usage environment and a usage purpose thereof. In this case, when the plurality of battery cells that is electrically connected needs to be solidly supported, the plurality of battery cells may maintain an electrical connection state.

As such, a technology in which the plurality of battery cells is electrically connected and the plurality of battery cells is solidly supported has been already disclosed in Korean Patent Publication No. 2012-0051237 entitled "Battery Module Case". The registered patent includes a case which is separated into upper, lower, and side surfaces and the plurality of battery cells is stably supported by the case.

However, when a separate case for supporting the plurality of battery cells is configured like the registered patent, there are problems described below.

First, as the number of battery cells joined to the inside of the case is limited, extension of the battery cell is limited.

Second, a weight, an appearance, and the like of the entire battery module constituted by the plurality of battery cells become large more than desired.

Third, manufacturing cost of the battery module is increased.

SUMMARY OF THE INVENTION

A first object of the present invention is to provide a battery cell and a battery module using the same that allow the battery cell to be extended without a limit in the number of battery cells.

A second object of the present invention is to provide a battery cell and a battery module using the same that allow a slim battery module to be manufactured.

A third object of the present invention is to provide a battery cell and a battery module using the same that allow manufacturing cost to be saved.

An exemplary embodiment of the present invention provides a battery cell including: a body; at least one rail installed in the body; and at least one rail groove formed on the other surface of the body on which the rail is not installed.

The rail may have a cross section that is gradually extended toward an outside direction of the body and the rail groove may have a cross section that is gradually extended toward an inside direction of the body.

A cooling hole that is opened to the outside may be formed on the rail.

Another exemplary embodiment of the present invention provides a battery module including: a first battery cell having at least one first rail installed in a first body and at least one first rail groove formed on the other surface of the first body where the first rail is not installed; and a second battery cell having at least one second rail installed in a second body and at least one second rail groove formed on the other surface of the second body where the second rail is not installed, and the first rail slides along the second rail groove or the second rail slides along the first rail groove, such that the first battery cell and the second battery cell are joined to each other.

The first rail and the second rail may have cross sections that are gradually extended toward outside directions of the first body and the second body, and the first rail groove and the second rail groove may have cross sections that are gradually extended toward inside directions of the first body and the second body.

A cooling hole that is opened to the outside may be formed on the first rail and the second rail.

The battery module may further include an aligning unit installed between the first rail and the second rail groove and between the second rail and the first rail groove so that slide driving of the first battery cell or the second battery cell is stopped at alignment positions of the first battery cell and the second battery cell.

The aligning unit may include an alignment groove formed at any one of the first rail and the second rail groove and any one of the second rail and the first rail groove; and a stopper installed at the other one of the first rail and the second rail groove and the other one of the second rail and the first rail groove, in which the alignment groove is not formed.

The stopper may further include a ball installed at the other one of the first rail and the second rail groove and the other one of the second rail and the first rail groove, in which the alignment groove is not formed; and an elastic body elastically supporting the ball.

The stopper may be a leaf spring installed at the other one of the first rail and the second rail groove and the other one of the second rail and the first rail groove, in which the alignment groove is not formed, and having a convex portion at a position corresponding to the alignment groove.

The stopper may further include a lead that is extended from the leaf spring and exposed to the outside of the first battery cell and the second battery cell joined to alignment positions.

In the battery cell and the battery module using the same according to the present invention, the number of battery cells can be increased without a limit in the number of battery cells.

In the battery cell and the battery module using the same according to the present invention, a slim battery module can be manufactured.

In the battery cell and the battery module using the same according to the present invention, manufacturing cost of the battery module can be saved.

DETAILED DESCRIPTION

Terms or words used in the present specification and claims should not be interpreted as being limited to typical or dictionary meanings, but should be interpreted as having meanings and concepts which comply with the technical spirit of the present invention, based on the principle that an inventor can appropriately define the concept of the term to describe his/her own invention in the best manner. Therefore, configurations illustrated in the embodiments and the drawings described in the present specification are only the most preferred embodiment of the present invention and do not represent all of the technical spirit of the present invention, and thus it is to be understood that various modified examples, which may replace the configurations, are possible when filing the present application.

Figure 1:
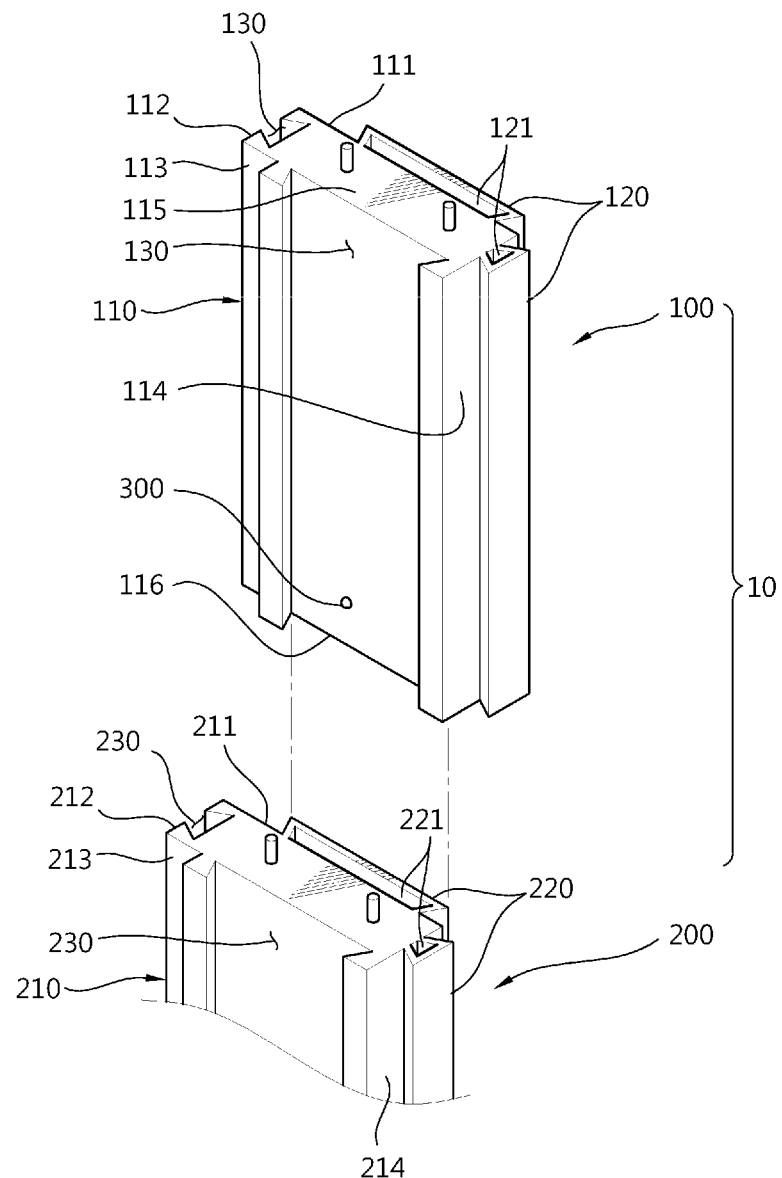
FIG. 1 is a diagram illustrating a battery module according to a first exemplary embodiment.
Figure 2:
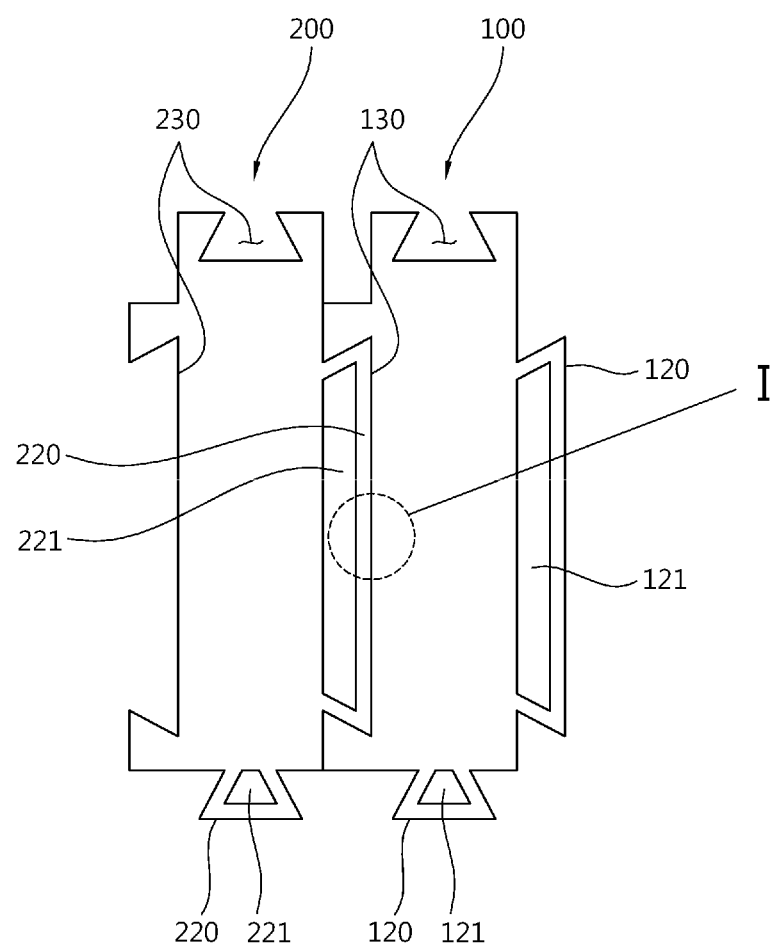
FIG. 2 is a diagram illustrating an extension state of the battery module according to the first exemplary embodiment.

FIG. 1 is a perspective view illustrating a battery module according to a first exemplary embodiment. FIG. 2 is a plan view illustrating the battery module according to the first exemplary embodiment.

Referring to FIGS. 1 and 2, a battery module (hereinafter, referred to as 'battery module') 10 according to the exemplary embodiment includes a first battery cell 100 and a second battery cell 200.

Although not illustrated, a cathode, an anode, a separator, an electrolyte, and the like may be installed in bodies of the first battery cell 100 and the second battery cell 200. Since an internal structure of the battery cell has already been widely known in the art, a detailed description will be omitted.

The first battery cell 100 includes a first body 110. The first body 110 is formed by a rectangular housing. That is, the first body 110 includes first, second, third, and fourth surfaces 111, 112, 113, and 114 forming a lateral surface, a fifth surface 115 forming a top surface, and a sixth surface 116 forming a bottom surface. A first rail 120 is installed on each of the first surface 111 and the second surface 112 adjacent to the first surface 111. A first rail groove 130 is formed on each of the third surface 113 adjacent to the second surface 112 and the fourth surface 114 adjacent to the third surface 113.

Since a shape and a configuration of the second battery cell 200 are substantially the same as those of the first battery cell 100, a detailed description thereof will be omitted. A second rail 220 is installed on each of a first surface 211 and a second surface 212 of the second battery cell 200 and a second rail groove 230 is formed on each of a third surface 213 and a fourth surface 214 of the second battery cell 200.

In the first battery cell 100 and the second battery cell 200, the first rail 120 slides along the second rail groove 230 or the second rail 220 slides along the first rail groove 130 to be joined to each other.

In this case, the first rail 120 has a cross section which is gradually enlarged toward an outside direction of the first body 110 and the second rail 220 has a cross section which is gradually enlarged toward an outside direction of a second body 210 so that the first battery cell 100 and the second battery cell 200 that are joined to each other are not removed in a thickness direction of the first rail 120 and a thickness direction of the second rail 220. The first rail groove 130 has a cross section which is gradually enlarged toward an inside direction of the first body 110 and the second rail groove 230 has a cross section which is gradually enlarged toward an inside direction of the second body 210.

Cooling holes 121 and 221 that are opened to the outside may be formed in the first rail 130 and the second rail 230, respectively. The cooling holes 121 and 221 form a path of a fluid (for example, coolant such as air and cooling gas) between the first battery cell 100 and the second battery cell 200 that are joined to each other, thereby cooling the first battery cell 100 and the second battery cell 200.

Meanwhile, the battery module 10 further includes an aligning unit 300 that aligns the first battery cell 100 and the second battery cell 200 at alignment positions and prevents the first battery cell 100 or the second battery cell 200 from sliding at the alignment position.

Figure 3:
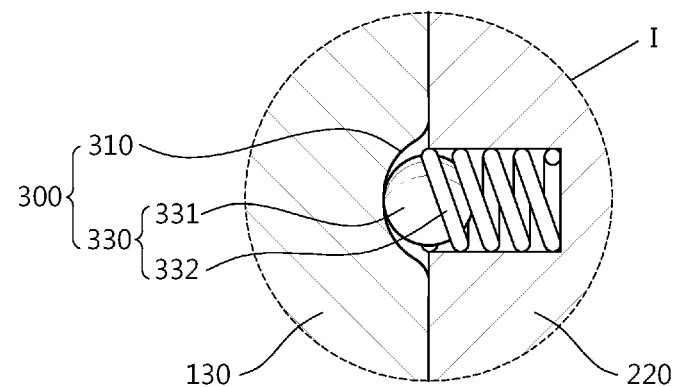
FIG. 3 is a diagram illustrating an aligning unit of the battery module according to the first exemplary embodiment by enlarging part "I" marked in FIG. 2.

FIG. 3 is a diagram illustrating an aligning unit of the battery module according to the first exemplary embodiment by enlarging part "I" marked in FIG. 2.

Referring to FIG. 3, the aligning unit 300 of the battery module according to the first exemplary embodiment includes an alignment groove 310 and a stopper 330. The alignment groove 310 is formed on the first rail groove 130. The stopper 330 is installed at the second rail 220. The stopper 330 may include a ball 331 and an elastic body 332. The ball 331 may be installed to be maintained in a rolling action and restrained by the elastic body 332 so that the ball 331 is not removed from the elastic body 332 even in the state where the first battery cell 100 and the second battery cell 200 are separated from each other.

Therefore, as the second rail 220 slides along the first rail groove 130, the stopper 330 moves toward the alignment groove 310. In this case, the ball 331 is pressed by the first rail groove 130 and the elastic body 332 is compressed by pressing force of the first rail groove 130.

Continuously, when the second rail 220 slides along the first rail groove 130 and the first battery cell 100 and the second battery cell 200 reach the alignment positions, the ball 331 elastically supported by the elastic body 332 is inserted into the alignment groove 310. Therefore, the first battery cell 100 and the second battery cell 200 do not slide any longer and may be solidly joined at the alignment positions.

Thereafter, when the first battery cell 100 and the second battery cell 200 are separated from each other, the ball 331 is removed from the alignment groove 310 by pressing force used when a worker presses the first battery cell 100 or the second battery cell 200, and the first battery cell 100 and the second battery cell 200 may be smoothly separated from each other.

Figure 4:
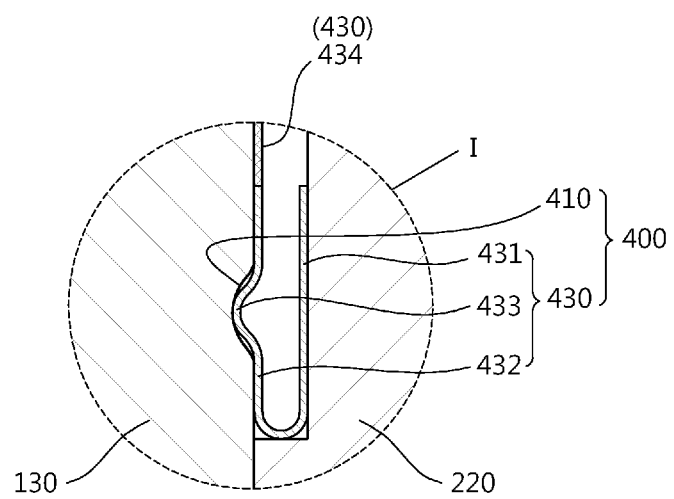
FIG. 4 is a diagram illustrating an aligning unit of a battery module according to a second exemplary embodiment by enlarging part "I" marked in FIG. 2.

FIG. 4 is a diagram illustrating an aligning unit of a battery module according to a second exemplary embodiment by enlarging part "I" marked in FIG. 2.

Referring to FIG. 4, an aligning unit 400 of a battery module according to the second exemplary embodiment includes an alignment groove 410 and a stopper 430. The alignment groove 410 is formed on the first rail groove 130. The stopper 430 is installed at the second rail 220. The stopper 430 may be a leaf spring. The stopper 430 is constituted by a fixing portion 431 installed in the second rail 220 and an elastic portion 432 bent from the fixing portion 431 and facing the first rail groove 130 and a convex portion 433 that protrudes toward the first rail groove 130 may be formed at the elastic portion 432. The stopper 430 may include a lead 434 that is extended from the convex portion 433 and exposed to the outside of the first battery cell 100 and the second battery cell 200 that are joined at the alignment positions.

Therefore, as the second rail 220 slides along the first rail groove 130, the stopper 430 moves toward the alignment groove 410. In this case, the elastic portion 432 and the convex portion 433 are pressed by the first rail groove 130 and compressed to the fixing portion 431 side by pressing force of the first rail groove 130.

Continuously, when the second rail 220 slides along the first rail groove 130 and the first battery cell 100 and the second battery cell 200 reach the alignment positions, the convex portion 433 elastically supported by the elastic portion 432 is inserted into the alignment groove 410. Therefore, the first battery cell 100 and the second battery cell 200 do not slide any longer and may be solidly joined at the alignment positions.

Thereafter, when the first battery cell 100 and the second battery cell 200 are separated from each other, as a worker presses the lead 434, the convex portion 433 is removed from the alignment groove 410, and the first battery cell 100 and the second battery cell 200 may be smoothly separated from each other.

In the above description, the alignment grooves 310 and 410 are formed on the first rail groove 130 and the stoppers 330 and 430 are formed on the second rail 220, but the alignment grooves 310 and 410 are formed on any one of the first rail 120 and the second rail groove 230 and any one of the second rail 220 and the first rail groove 130 and the stoppers 330 and 430 may be installed at the other one of the first rail 120 and the second rail groove 230 and the other one of the second rail 220 and the first rail groove 130, in which the alignment groove 310 is not formed.

As such, a joining state of the first battery cell 100 and the second battery cell 200 may be solidly maintained at the alignment positions by the aligning unit 300.

Figure 5:
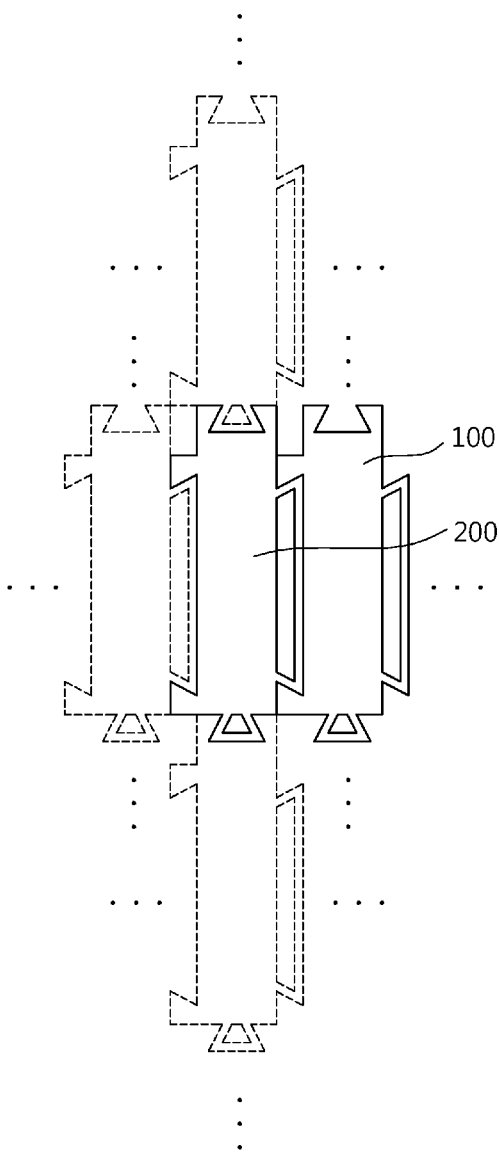
FIG. 5 is a diagram illustrating a state of the battery module that a battery cell having the same structure as the first battery cell or the second battery cell is additionally joined.

As illustrated in FIG. 5, a battery cell having the same structure as the first battery cell 100 or the second battery cell 200 may be additionally joined to at least any one of the other first rail 120 or the other first rail groove 130 of the first battery cell 100 and the other second rail 220 or the other second rail groove 230 of the second battery cell 200.

Accordingly, in the battery cell and the battery module using the same according to the present invention, the number of battery cells is not limited, the battery cell can be extended, and a slim battery module can be manufactured at low manufacturing cost.

It should not be analyzed that the exemplary embodiments of the present invention, which are described above and illustrated in the drawings limit the technical spirit of the present invention. The protection scope of the present invention is limited by only matters described in the appended claims and various modifications and changes of the technical spirit of the present invention can be made by those skilled in the art. Accordingly, the modifications and changes will be included in the protection scope of the present invention if the modifications and changes are apparent to those skilled in the art.

What is claimed is:

1. A battery cell, comprising:
    a body;
    at least one rail installed on the body;
    at least one rail groove formed on a surface of the body on which the rail is not installed; and
    at least one cooling hole in the rail,
    wherein the cooling hole is opened to outside at the end of the rail and forms a path of a fluid,
    wherein the rail has a cross section that is gradually extended toward an outside direction of the body,
    wherein the cooling hole has a cross section that is gradually extended toward an outside direction of the body, and
    wherein the rail groove has a cross section that is gradually extended toward an inside direction of the body.

2. A battery module, comprising:
    a first battery cell having at least one first rail installed on a first body, at least one first rail groove formed on a surface on an opposite side of the first body where the first rail is not installed, and a first cooling hole in the first rail; and
    a second battery cell having at least one second rail installed on a second body, at least one second rail groove formed on a surface on an opposite side of the second body where the second rail is not installed, and a second cooling hole in the second rail;
    wherein the first rail slides along the second rail groove or the second rail slides along the first rail groove, such that the first battery cell and the second battery cell are joined to each other,
    wherein the first cooling hole and the second cooling hole are opened to outside at the end of the first and second rail, respectively, and form paths of a fluid,
    wherein the first rail and the second rail have cross sections that are gradually extended toward outside directions of the first body and the second body, respectively,
    wherein the first cooling hole and the second cooling hole have cross sections that are gradually extended toward outside directions of the first body and the second body, respectively, and
    wherein the first rail groove and the second rail groove have cross sections that are gradually extended toward inside directions of the first body and the second body, respectively.

3. The battery module of claim 2, further comprising:
    an aligning unit installed between the first rail and the second rail groove and between the second rail and the first rail groove so that slide driving of the first battery cell or the second battery cell is stopped at alignment positions of the first battery cell and the second battery cell.

4. The battery module of claim 3, wherein the aligning unit includes:
    an alignment groove formed at any one of the first rail and the second rail groove and any one of the second rail and the first rail groove; and
    a stopper installed at the other one of the first rail and the second rail groove and the other one of the second rail and the first rail groove, in which the alignment groove is not formed.

5. The battery module of claim 4, wherein the stopper further includes:
    a ball installed at the other one of the first rail and the second rail groove and the other one of the second rail and the first rail groove, in which the alignment groove is not formed; and
    an elastic body elastically supporting the ball.

6. The battery module of claim 4, wherein the stopper is a leaf spring installed at the other one of the first rail and the second rail groove and the other one of the second rail and the first rail groove, in which the alignment groove is not formed, and having a convex portion at a position corresponding to the alignment groove.

7. The battery module of claim 6, wherein the stopper further includes a lead that is extended from the leaf spring and exposed to the outside of the first battery cell and the second battery cell joined to alignment positions.

\* \* \* \* \*